United States Patent
Sako et al.

(12)

(10) Patent No.: US 6,732,271 B1
(45) Date of Patent: May 4, 2004

(54) METHOD OF DECIPHERING CIPHERED DATA AND APPARATUS FOR SAME

(75) Inventors: Kazuhiko Sako, Isehara (JP); Satoshi Oguni, Hadano (JP); Takushi Tamura, Hadano (JP); Naoki Hirayama, Hadano (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/540,268

(22) Filed: Mar. 31, 2000

(30) Foreign Application Priority Data

Apr. 1, 1999 (JP) .......................................... 11-094744

(51) Int. Cl.[7] ............................................... H04L 9/06
(52) U.S. Cl. ...................... 713/189; 713/200; 713/168; 380/29; 380/30
(58) Field of Search ................................ 713/152, 168, 713/180, 189, 200; 380/28, 29, 30

(56) References Cited

U.S. PATENT DOCUMENTS 6,324,286 B1 * 11/2001 Lai et al. ....................... 380/29
6,504,930 B2 * 1/2003 Enari ............................ 380/37
6,542,607 B1 * 4/2003 Euchner et al. ............... 380/37

* cited by examiner

*Primary Examiner*—Norman M. Wright
(74) *Attorney, Agent, or Firm*—Antonelli, Terry, Stout & Kraus, LLP

(57) ABSTRACT

A method of deciphering ciphered data in which in parallel to a deciphering process for first ciphered data, a first chaining value to be used for deciphering second ciphered data is generated, by using the generated chaining value, a process of deciphering the second ciphered data is executed, and in parallel to a deciphering process for the second ciphered data, a second chaining value to be used for deciphering third ciphered data is generated.

5 Claims, 5 Drawing Sheets

CBC ENCIPHERING

CBC DECIPHERING

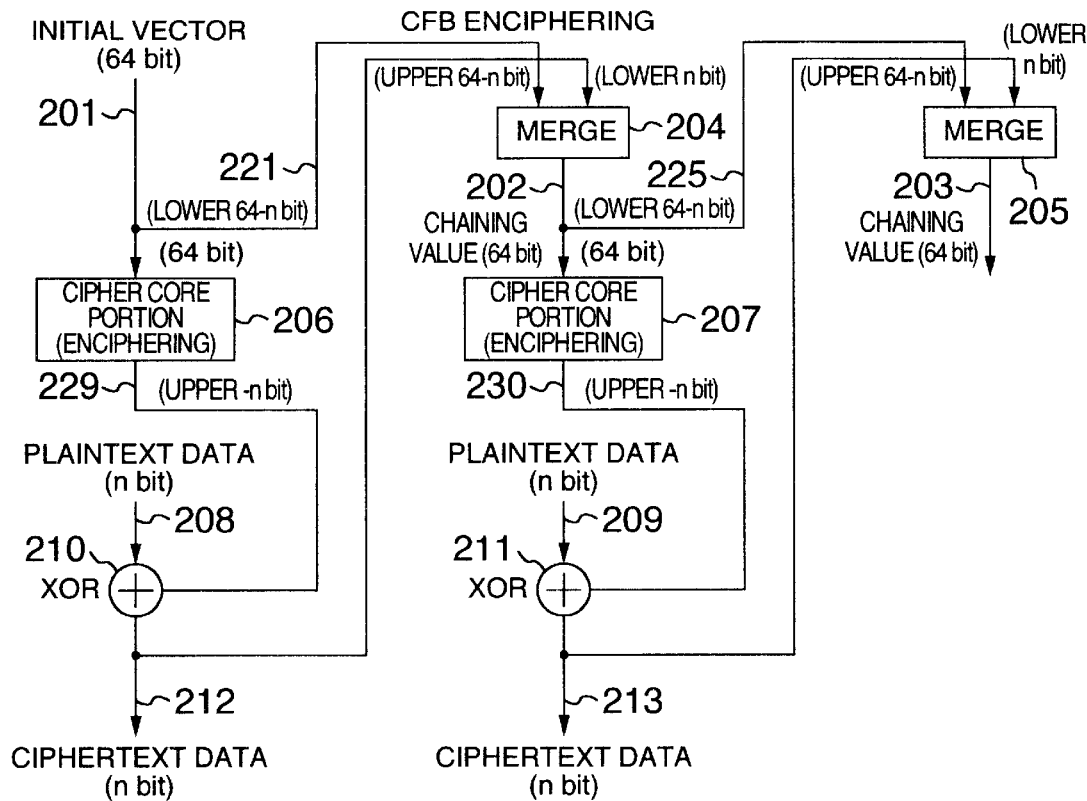
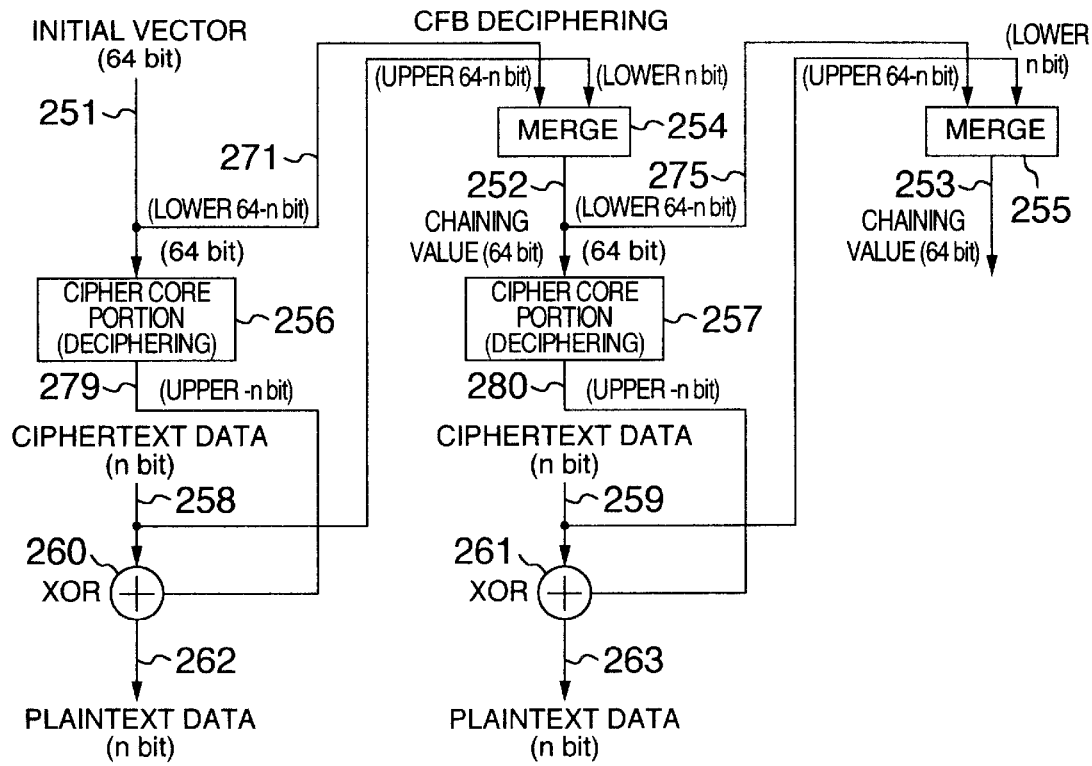

METHOD OF DECIPHERING CIPHERED DATA AND APPARATUS FOR SAME

BACKGROUND OF THE INVENTION

The present invention relates to a cryptosystem in which ciphering/deciphering at one block influences ciphering/deciphering at the next block, for example, in as a CBC (Cipher Block Chaining) mode or a CFB (Cipher Feedback) mode, and more particularly to a method of deciphering ciphered data at high speed and an apparatus therefor.

Encryption is one of fundamental techniques for protecting data flowing on a data communications network or data stored in a computer system, and it means conversion of data so that a third party cannot use the data illegally. When data is transmitted, "encryption" is performed at a transmission side to change a common communication message "plaintext" into a "ciphertext" which cannot be read directly. At the reception side, "decryption" is performed to recover the original plaintext from the ciphertext. In this case, a parameter for controlling enciphering and deciphering is called a "key". By using this key, the reception side can easily decipher the ciphertext.

In cipher communications, it is important that a cipher strength is high, i.e., the communications contents are hard to be deciphered by a third party and that enciphering and deciphering can be executed at high speed in order not to make ordinary senders and receivers feel any practical trouble.

DES (Data Encryption Standard) is a cryptosystem most widely prevailed in the fields of data communications. DES is not only used with a standard data cryptosystem by institutes of the federal government of the U.S. but also is widely prevailing in private organizations. DES provides such a cryptosystem that a plaintext is divided into blocks each having 64 bits and a plaintext of 64 bits is enciphered by using a key of 56 bits to form a ciphertext of 64 bits. In order to realize this, a main portion (cipher core portion) of a DES cipher mechanism is constituted of 16-round DES cipher stages which output a ciphertext of 64 bits by dividing a plaintext of 64 bits into a 32-bit portion and another 32-bit portion and by sequentially generating keys K1 to K16 of 48 bits from a key of 56 bits to repeat a permutation process sixteen times.

The American National Standards Institute (ANSI) defines four operation modes of DES (Specification: ANSI X3. 106-1983). Namely, these modes are an ECB (Electronic Codebook) mode, a CBC (Cipher Block Chaining) mode, a CFB (Cipher Feedback) mode, and an OFB (Output Feedback) mode. Of these modes, the ECB mode ciphers each set of 64 bits independently. Therefore, the ECB mode can perform parallel processing with a plurality of DES cipher operators or pipelining a DES cipher operator, so that although the ECB mode can execute enciphering/deciphering at higher speed than the other three modes, the cipher strength is lower. On the other hand, in the CBC, CFB and OFB modes, enciphering/deciphering of one block influences enciphering/deciphering of the next block. Namely, the result of the previous enciphering/deciphering is reflected as a chaining value. By using this chaining value, the next enciphering/deciphering is performed. Therefore, although the cipher strength becomes higher than the ECB mode, parallel processing cannot be effectively utilized so that a high speed operation is more difficult than the ECB mode.

Generally, in all the modes of ECB, CBC, CFB and OFB for DES enciphering and deciphering, a long processing time is taken by 16-round DES cipher stages which are a nuclei of the cryptosystem, and a very short processing time relative to that by the 16-round DES cipher stages is taken by the processes to be executed before and after the operations by the 16-round DES cipher stages. According to a conventional speed-up approach, a process requiring a short process time other than the process by the DES cipher stages is speeded up to speed up the DES cipher mechanism. For example, the publication of JP-A-10-74044 discloses a method of outputting enciphered/deciphered data to an output register after a proper number of cycles after data is input to the cipher stage. With this method, it becomes possible to operate a circuit portion other than the DES cipher stages at a higher clock frequency than that corresponding to the processing time taken by the DES cipher stages. Enciphering and deciphering can therefore be executed at high speed in all the operation modes of the DES cipher mechanism.

However, in conventional deciphering in the CBC and CFB modes (also in the OFB mode), ciphertext data A is sequentially transited to an input data generation stage, to a cipher core portion execution stage, and to an output data and chaining value generation stage, and thereafter by using a generated chaining value, next ciphertext data B is sequentially transited in a similar manner to the input data generation stage, to the cipher core portion execution stage, and to the output data and chaining value generation stage. It is therefore impossible to make a plaintext output interval shorter than a cipher core portion execution time.

More specifically, if a clock frequency is raised, it is possible to shorten the time from when plaintext data is input to when ciphertext data is output, or the time from when ciphertext data is input to when plaintext data is output. However, in the CBC, CFB and OFB modes hard to execute parallel processing, data throughput has an upper limit corresponding to the throughput of the DES cipher stages which take the longest processing time in the DES cipher mechanism.

SUMMARY OF THE INVENTION

Of the CBC, CFB and OFB modes, only the OFB mode requires output data of the cipher core portion in order to generate the chaining value for next calculation of deciphering, and the CBC and CFB modes do not require output data of the cipher core portion in order to generate the chaining value because these modes incorporate the algorithm that the chaining value for next calculation is generated from input data and/or a previous chaining value. The present invention therefore pays attention to the algorithm of the CBC and CFB modes and provides a method and apparatus for improving data throughput for deciphering in the CBC and CFB modes.

According to the present invention, in deciphering in the CBC and CFB modes of a DES cipher mechanism or the like, while cipher data is deciphered, a chaining value necessary for deciphering next cipher data is generated in advance. It is therefore possible for one or more DES operators to continuously decipher data or decipher a plurality set of data at the same time, to thereby provide an improved data throughput. Generally, a time taken to generate a chaining value for deciphering next data is very short as compared to the execution time taken by 16-round DES cipher stages. Therefore, by generating a chaining value at a proper timing, if one DES operator can execute one deciphering process at a time, for example, two DES operators ensure a two-fold throughput.

The invention is not limited only to the DES cipher mechanism but is applicable to various cipher mechanisms having an operation mode such as CBC mode and CFB mode not requiring output data of the cipher core portion in order to generate the chaining value for next calculation.

BRIEF DESCRIPTION OF THE DRAWINGS

FIGS. 2A and 2B are diagrams illustrating the concept of enciphering/deciphering in a CFB mode.

DETAILED DESCRIPTION OF THE EMBODIMENTS

An embodiment of the invention will be described with reference to the accompanying drawings.

Figure 1A:
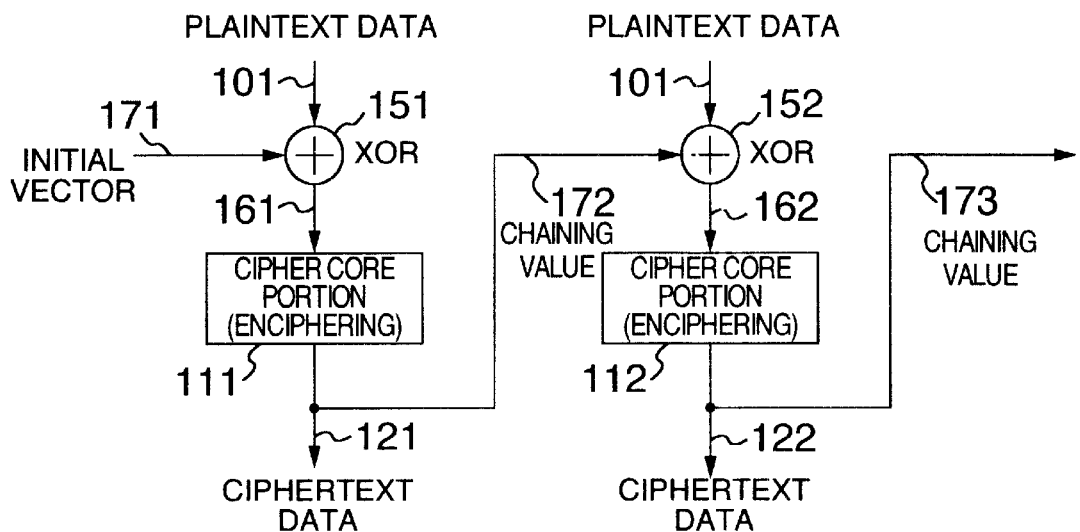
FIGS. 1A and 1B are diagrams illustrating the concept of enciphering/deciphering in a CBC mode.

FIG. 1 illustrates the concept of data enciphering/deciphering in the CBC mode according to the invention. As shown in FIG. 1A, in enciphering in the CBC mode of this invention, when plaintext data 101 is input, this plaintext data 101 is XORed (exclusive logical OR) 151 with an initial vector (initialization of a chaining value) 171. This XORed output data 161 is input to a cipher core portion 111, i.e., 16-round DES cipher stages, to be enciphered. Data output from the cipher core portion 111 is ciphertext data 121 and also becomes a chaining value 172 to be used for enciphering next plaintext data 102. This plaintext data 102 is XORed 152 with the chaining value 172. This XORed output data 102 is input to a cipher core portion 112. Data output from the cipher core portion 112 is ciphertext data 112 and also becomes a chaining value 173 to be used for enciphering next plaintext data. A similar operation is repeated for each plaintext data.

Figure 1B:
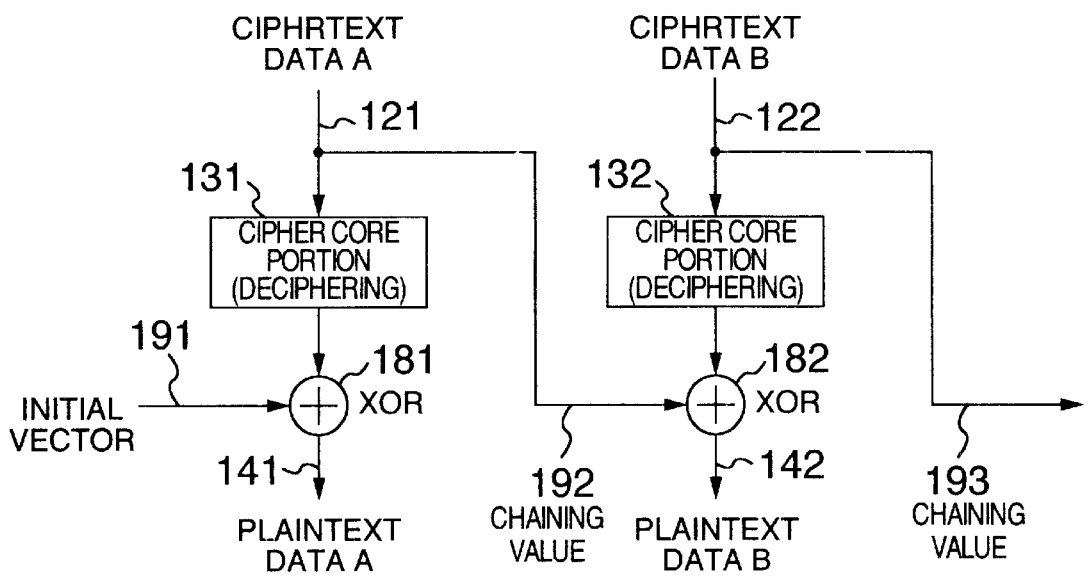

In deciphering in the CBC mode of this invention, as shown in FIG. 1B, ciphertext data 121 is input to a cipher core portion 131. Data output from the cipher core portion 131 is XORed 181 with an initial vector 191 and output as plaintext data 141. In this case, the input ciphertext data 121 is used as a chaining value 192 for deciphering next ciphertext data 122. The ciphertext data 122 is input to a cipher core portion 132 to be deciphered. Data output from the cipher core portion 132 is XORed 182 with the chaining value 192 and output as plaintext data 142. Also in this case, the ciphertext data 122 is used as a chaining value 193 for deciphering next ciphertext data.

As above, in deciphering in the CBC mode of this invention, data output from the cipher core portion is not used for deciphering next data. It is therefore possible to execute in parallel cipher core portions which take a long processing time, and improve data throughput. In this case, a plurality of cipher core portions are not necessarily required to be executed at the same time. Even if a single cipher core portion is used, this cipher core portion can be executed continuously to thereby improve data throughput. Further, the cipher core portion is not required to be a DES cipher stage, but may be other cipher mechanisms. This is also true for the CFB mode to be described next.

FIG. 2 illustrates the concept of data enciphering/deciphering in the CFB mode according to the invention. As shown in FIG. 2A, in enciphering in the CFB mode of this invention, an initial vector (64 bits) 201 is input to a cipher core portion 206. An upper n-bit output 229 of the cipher core portion 206 is XORed 210 with plaintext data (n-bit) 208 and output as ciphertext data (n-bit) 212. The n-bit of the ciphertext data 212 is merged 204 with a lower (64-n)-bit 221 of the initial vector 201 (212 is merged as a lower n-bit and 221 is merged as an upper (64-n)-bit), the merged data becoming a chaining value (64 bits) 202 for enciphering next plaintext data. The chaining value 202 is input to a cipher core portion 207. An upper n-bit output 230 of the cipher core portion 207 is XORed 211 with plaintext data (n-bit) 209 and output as ciphertext data (n-bit) 213. The n-bit of the ciphertext data 213 is merged with a lower (64-n)-bit 225 of the chaining value 202, the merged data becoming a chaining value (64 bits) 203 for enciphering next plaintext data.

In deciphering in the CFB mode of this invention, as shown in FIG. 2B, an initial vector (64 bits) 251 is input to a cipher core portion 256. An upper n-bit output 279 of the cipher core portion 256 is XORed 260 with ciphertext data (n-bit) 258 and output as plaintext data (n-bit) 262. The n-bit of the ciphertext data 258 is merged 244 with a lower (64-n)-bit 271 of the initial vector 251 to generate a chaining value (64 bits) 252. The chaining value 252 is input to a cipher core portion 257. An upper n-bit output 280 of the cipher core portion 257 is XORed 261 with ciphertext data (n-bit) 259 and output as plaintext data (n-bit) 263. Also in this case, the n-bit of the ciphertext data 259 is merged 255 with a lower (64-n)-bit 275 of the chaining value 252, to generate a next chaining value (64 bits) 253.

Also in deciphering in the CFB mode of this invention, similar operations to deciphering in the CBC mode of this invention are applied. Namely, only the merge result of the initial vector 251 and ciphertext data 258 is required to execute the cipher core portion 257. Therefore, while the cipher core portion 256 is executed, the cipher core portion 257 for the next ciphertext data 259 can be executed to thereby improve data throughput. In this case, similar to the CBC mode, a plurality of cipher core portions are not necessarily requited to be executed at the same time. A single cipher core portion may be executed continuously.

Figure 3:
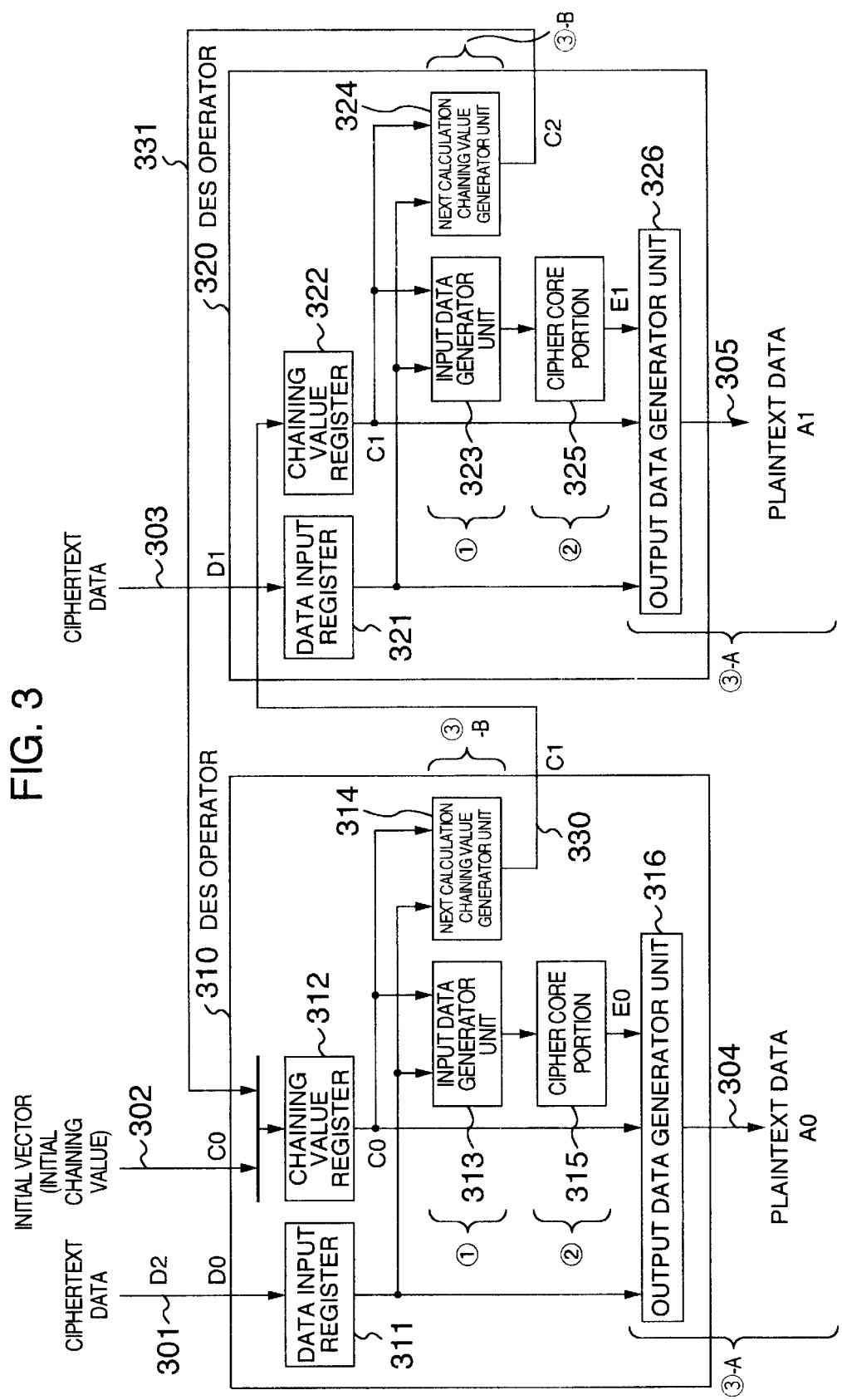
FIG. 3 is a block diagram of a deciphering apparatus in the CBC/CFB mode of a DES cipher mechanism embodying the present invention.

FIG. 3 is a block diagram of a deciphering apparatus in the CBC/CFB mode of a DES cipher mechanism embodying the present invention. In this embodiment, the DES cipher mechanism has two DES operators 310 and 320. Although the DES cipher mechanism has a control unit for switching between the CBC and CFB modes and for other operations, this is omitted in FIG. 3.

Referring to FIG. 3, the DES operator 310 has a data input register 311, a chaining value register 312, an input data generator unit 313, a next calculation chaining value generator unit 314, a cipher core portion 315 and an output data generator unit 316. The other DES operator 320 has quite the same structure as the DES operator 310. An output 330 of the next calculation chaining value generator unit 314 of the DES operator 310 is input to the chaining value register 322 of the DES operator 320, whereas an output 331 of the next calculation chaining value generator unit 324 of the DES operator 320 is input to the chaining value register 312 of the DES operator 310. Each of the cipher core portions 315 of the DES operators 310 and 320 is constituted of 16-round DES cipher stages.

In the example shown in FIG. 3, although two DES operators are used, three or more DES operators may be used. If a mechanism for storing values of the data input register 311 and chaining value register 312 is provided, only one DES operator may be used, for example, by providing the DES operator with a pipeline structure to execute the next DES cipher operation while one DES cipher operation is executed. The cipher mechanism is not limited only to the DES cipher mechanism, but other various cipher mechanisms may be used so long as they provide the CBC or CFB mode.

First, the operation of deciphering in the CBC mode of this invention will be described. First, ciphertext data 301 is set to the data input register 311 of the DES operator 310 and an initial vector 302 is set to the chaining value register 312 of the DES operator 310. In the CBC mode, the input data generator unit 313 selects the ciphertext data in the data input register 311 and inputs the cipher text data to the cipher core portion 315. After deciphering by the cipher core portion 315 is completed, the output data generator unit 316 generates plaintext data 304 from the output data of the cipher core portion 315 and the value in the chaining value register 312. In this case, at the same time when the cipher text data is input to the input data generator unit 313, the cipher text data is also input to the next calculation chaining value generator unit 314 which generates a chaining value 330 for next calculation before or while the cipher core portion 315 deciphers the ciphertext data, and sets the generated chaining value to the chaining value register 322 of the DES operator 320.

Next ciphertext data 303 is set to the data input register 321 of the DES operator 320 and selected by the input data generator unit 323 to be input to the cipher core portion 325. The output data generator unit 326 generates plaintext data 305 from the output data of the cipher core portion 325 and the value in the chaining value register 322.

Also in the DES operator 320, the next calculation chaining value generator unit 324 generates a chaining value 331 for next calculation from the cipher text data set to the data input register 321, before or while the cipher core portion 325 deciphers the ciphertext data, and sets the generated chaining value to the chaining value register 312 of the DES operator 310. At this time, next ciphertext data is being set to the data input register 311 of the DES operator 310. A similar operation is thereafter repeated.

Next, the operation of deciphering in the CFB mode of this invention will be described. First, ciphertext data 301 is set to the data input register 311 of the DES operator 310 and an initial vector 302 is set to the chaining value register 312 of the DES operator 310.

In the CFB mode, the input data generator unit 313 selects the value in the chaining value register 312 and inputs the selected value to the cipher core portion 315. The output data generator unit 316 generates plaintext data 304 from the output data of the cipher core portion 315 and the ciphertext data in the data input register 311.

Also in the CFB mode, at the same time when the value in the chaining value register 312 is input to the input data generator unit 313, the cipher text data in the data input register 311 and the value set to the chaining value register 312 are input to the next calculation chaining value generator unit 314 which generates a chaining value 330 for next calculation before or while the cipher core portion 315 deciphers the ciphertext data, and sets the generated chaining value to the chaining value register 322 of the DES operator 320. Before or after this setting, next ciphertext data 303 is set to the data input register 321 of the DES operator 320.

In the DES operator 320, the value in the chaining value register 322 is selected by the input data generator unit 323 and input to the cipher core portion 325. The output data generator unit 326 generates plaintext data 305 from the data output from the cipher core portion 325 and the ciphertext data in the data input register 321.

Also in the DES operator 320, before or while the cipher core portion 325 deciphers the plaintext data, the next calculation chaining value generator unit 324 generates a chaining value 331 for next calculation from the values set to the data input register 321 and chaining value register 322, and sets the generated chaining value to the chaining value register 312 of the DES operator 310. A similar operation is thereafter repeated.

In FIG. 3, a time taken by a path from the data input register 311 and chaining value resister 312 to the chaining value register 322 via the next calculation chaining value generator unit 314 and a time taken by a path from the data input register 321 and chaining value resister 322 to the chaining value register 312 via the next calculation chaining value generator unit 324, are sufficiently short as compared to the execution time of the cipher core portions 315 and 325 which execute very complicated calculations. Accordingly, by setting data to the data input registers 311 and 321 and chaining value registers 312 and 322 at proper timings, it is possible to realize the operation state that both the DES operators 310 and 320 always execute calculations in parallel.

As above, by providing a plurality of operators, data throughput can be improved scalably.

According to the present invention, in each DES operator, the chaining value to be supplied from a preceding stage is controlled not to be set to the chaining value register until plaintext data deciphered from ciphertext data is output.

Figure 4:
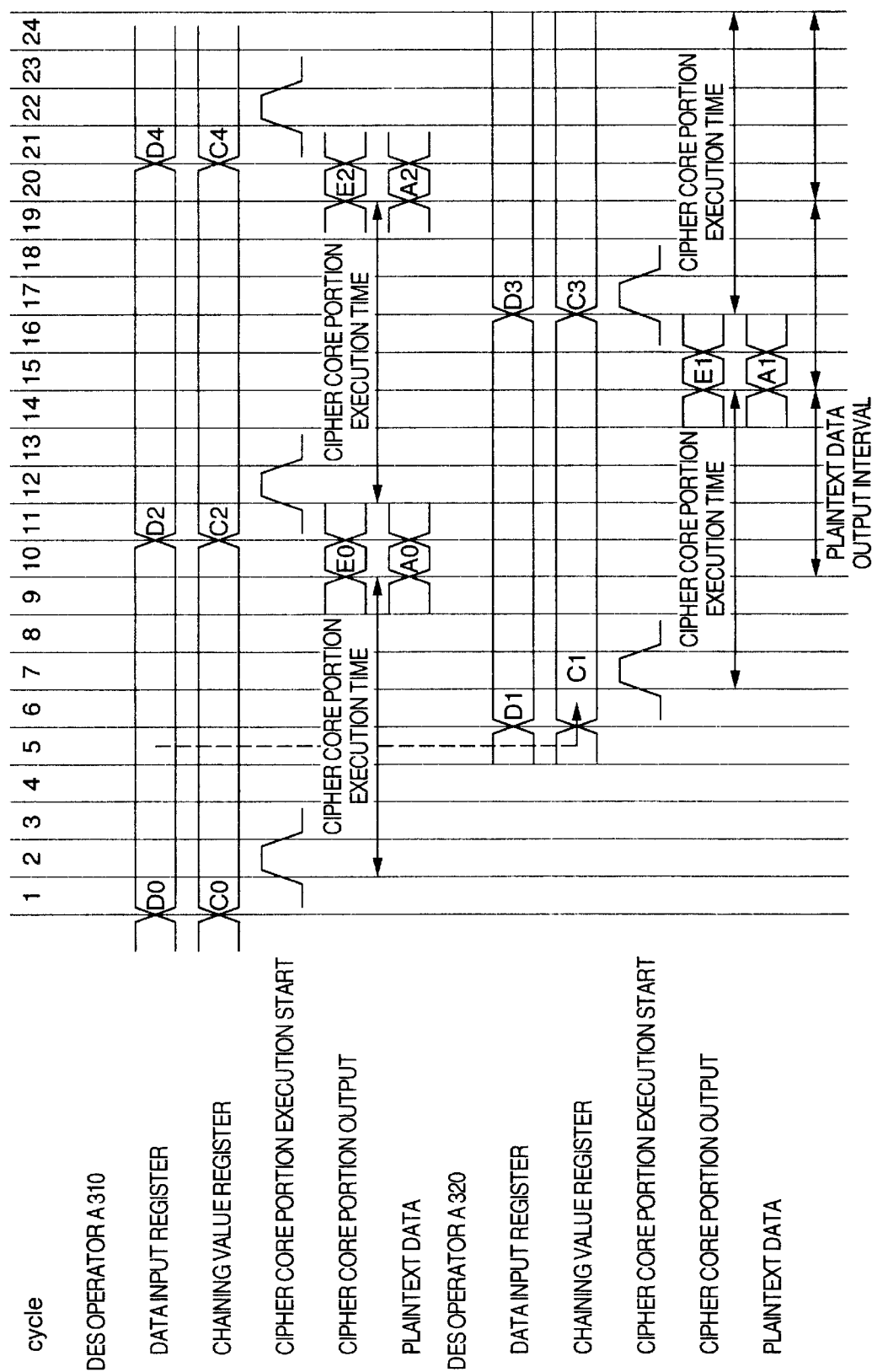
FIG. 4 is a timing chart illustrating the operation of deciphering in the CBC mode of the DES cipher mechanism embodying the present invention.

FIG. 4 is a timing chart illustrating an example of the operation of deciphering in the CBC mode of the DES cipher mechanism to which the embodiment shown in FIG. 3 is applied. It is assumed in FIG. 4 that a time taken from the data input register 311, 321 and chaining value register 312, 322 to the cipher core portion 315, 325 is one cycle, an execution time of the cipher core portion 315, 325 is eight cycles, and a time taken from the data input register 311, 321 to the chaining value register 322, 312 via the next calculation chaining value generator unit 314, 324 is one cycle. Deciphering in the CFB mode can be executed by similar timings.

In deciphering in the CBC mode, first in the DES operator 310, ciphertext data D0 is set to the data input register 311 and an initial vector C0 is set to the chaining value register 312. Then, D0 is input via the input data generator unit 313 to the cipher core portion 315 to start executing the cipher core portion 315. When the execution of the cipher core portion 315 is completed, the output data generator unit 316 generates plaintext data A0 from data E0 output from the cipher core portion 315 and the value C0 in the chaining value register 312. In parallel with this and during the execution of the cipher core portion 315, in the DES operator 310, the next calculation chaining value generator unit 314 sets, D0 in the data input register 311 as a chaining value C1 for next ciphertext data D1, to the chaining value resister 322 of the DES operator 320.

In the DES operator 320, before or after the value C1 is set to the chaining value register 322, the next ciphertext data D1 is set to the data input register 321. The next ciphertext data D1 in the data input register 321 is input via the input data generator unit 323 to the cipher core portion 325. The cipher core portion 325 in the DES operator 320 starts executing for the ciphertext data D1 by overlapping the execution of the cipher core portion 315 in the DES operator 310 for the ciphertext data D0. When the execution of the cipher core portion 325 is completed, the output data generator unit 326 generates plaintext data A1 from data E1 output from the cipher core portion 325 and the value C1 in the chaining value register 322. In parallel with this and during the execution of the cipher core portion 325 also in the DES operator 320, the next calculation chaining value generator unit 324 sets, D1 in the data input register 321 as a chaining value C2 for next ciphertext data D2, to the chaining value register 312 of the DES operator 310.

In the DES operator 310, before or after the value C2 is set to the chaining value register 312, the next ciphertext data D2 is set to the data input register 311. The cipher core portion 315 starts again executing by overlapping the execution of the cipher core portion 325 of the DES operator 320. A similar operation described above is thereafter repeated.

As seen from FIG. 4, according to the invention, a chaining value for next calculation is generated in advance by using two DES operators. It is therefore possible to decipher plaintext data at a plaintext data output interval of 5 cycles shorter than eight cycles of the cipher core execution time. Further, if the cipher core portion 315, 325 is made possible to operate with the same 8 cycle pitch by improving pre and post-processes in the cipher core portion 315, 325, it becomes possible to execute data deciphering with maximum 4 cycle pitch using the two DES operators 310 and 320.

Figure 5:
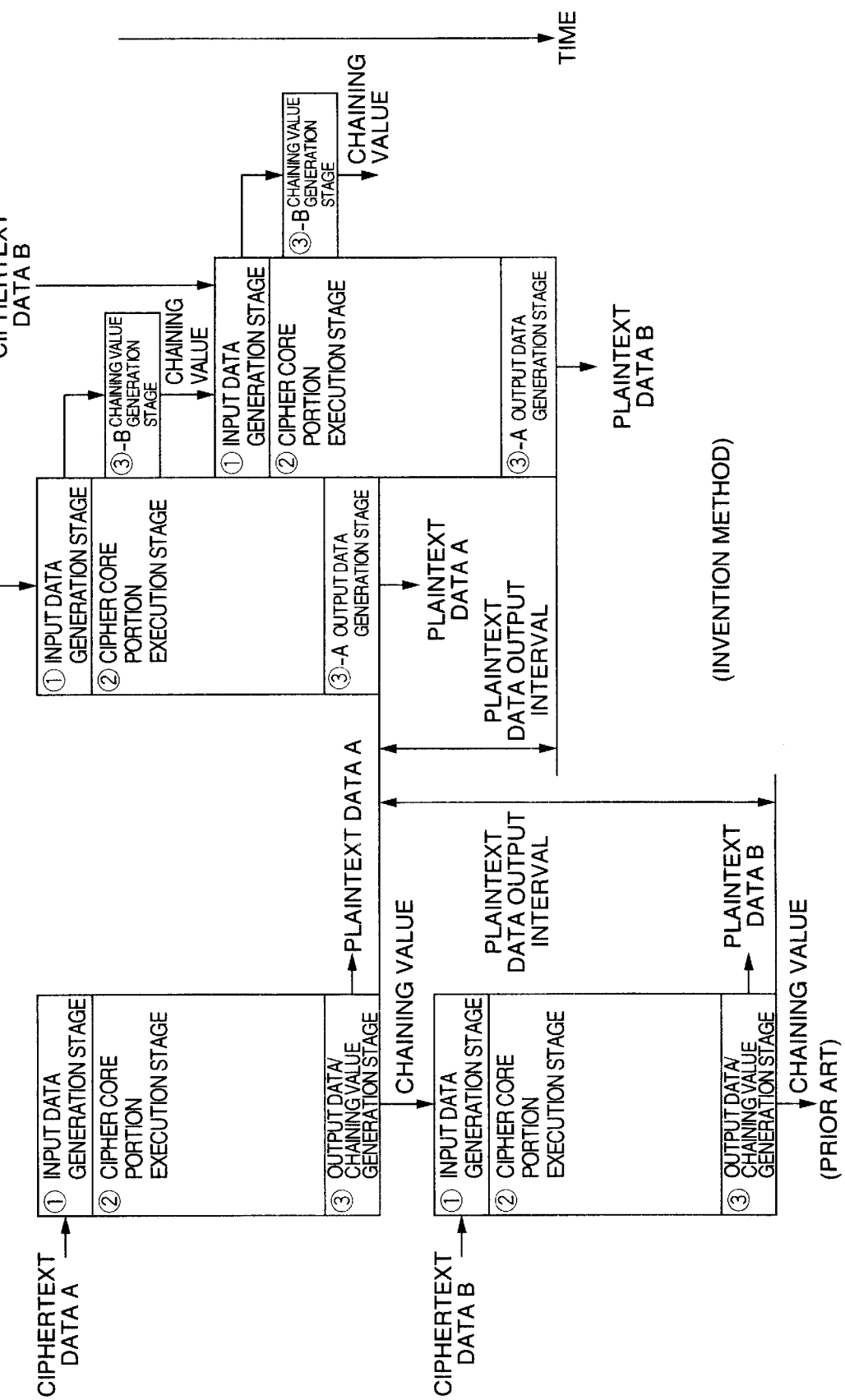
FIG. 5 illustrates transition of stages of a cipher data deciphering process according to a conventional technique and the present invention.

FIG. 5 is a transition diagram of deciphering process stages in the CBC/CFB mode of the DES cipher mechanism according to conventional techniques and prevent invention.

In conventional deciphering in the CBC and CFB modes (also in the OFB mode), ciphertext data A is transited to an input data generation stage ①, to a cipher core portion execution stage ②, and to an output data and chaining value generation stage ③, and thereafter by using a generated chaining value, next ciphertext data B is sequentially transited in a similar manner to the input data generation stage ①, to the cipher core portion execution stage ②, and to the output data and chaining value generation stage ③.

In deciphering in the CBC and CFB modes of this invention, although ciphertext data A is transited to an input data generation stage ①, to a cipher core portion execution stage ②, and to an output data generation stage "③-A", in parallel with the cipher core portion execution stage ② a chaining value generation stage "③-B" for the next ciphertext data B is executed. By using the generated chaining value, the next ciphertext data B is transited to the input data generation stage ①, to the cipher core portion execution stage ②, and to the output data generation stage "③-A", in parallel with the process for the ciphertext data A. Also in parallel with the cipher core portion execution stage ② for the ciphertext data B, the chaining value generation stage "③-B" for next ciphertext data is executed. Accordingly, it is possible to set a plaintext data output interval shorter than the cipher core portion execution time. If there is only a single cipher core portion, immediately after the preceding deciphering is completed, the next deciphering is executed so that the plaintext output interval can be set generally equal to the cipher core portion execution time.

The circuit blocks where the respective stages ①, ②, ③, ③-A and ③-B are executed are indicated in FIG. 3 by using identical symbols.

As seen from the foregoing description, in a cipher mechanism having a plurality of DES operators, data deciphering in the CBC and CFB modes can be speeded up in proportion to the number of DES operators without hardly consuming hardware resources. By adding DES operators, speed-up can be expected scalably. Even if only one DES operator is used, since the output data/chaining value generation time is negligible, speed-up can be expected correspondingly.

The present invention is not limited to the above-described embodiment. Various modifications are possible without departing from the scope of the claims of this invention.

What is claimed is:

1. A method for deciphering ciphered data for a cryptosystem in which data is sequentially enciphered by using a ciphered result of one data as a chaining value to be used for enciphering next data, the method comprising the steps of:

generating a first chaining value to be used for deciphering second ciphered data, in parallel to a process of deciphering first ciphered data;

executing a process of deciphering the second ciphered data by using said generated chaining value; and generating a second chaining value to be used for deciphering third ciphered data, in parallel to the process of deciphering the second ciphered data.

2. A deciphering method according to claim 1, further comprising a step of setting the second chaining value to be used for deciphering the third ciphered data after a process of deciphering the first ciphered data is completed.

3. An apparatus for deciphering ciphered data for a cryptosystem in which data is sequentially enciphered by using a ciphered result of one data as a chaining value to be used for enciphering next data, the apparatus comprising:

ciphered data storing means for storing ciphered data;

chaining value storing means for storing an initial value of an input chaining value;

deciphering means for deciphering ciphered data by using data in said chaining value storing means; and chaining value generating means for generating a chaining value to be used for deciphering next ciphered data, in parallel to deciphering one ciphered data.

4. A deciphering apparatus according to claim 3, wherein the apparatus includes a plurality sets of said ciphered data storing means, said chaining value storing means, said deciphering means and said chaining value generating means, an output of said chaining value generating means at a preceding stage is connected to an input of said chaining value storing means at a succeeding stage, and an output of said chaining value generating means at the succeeding stage is connected to said chaining value storing means at the preceding stage.

5. A deciphering apparatus according to claim 4, further comprising means for setting an output of the chaining value generating means at the succeeding stage to said chaining value storing means at the preceding means after deciphered data from said deciphering means was outputted.

* * * * *